United States Patent
Nakayama

(10) Patent No.: US 8,767,652 B2
(45) Date of Patent: Jul. 1, 2014

(54) RADIO BASE STATION AND COMMUNICATION CONTROL METHOD

(75) Inventor: Taku Nakayama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 156 days.

(21) Appl. No.: 13/395,864

(22) PCT Filed: Sep. 14, 2010

(86) PCT No.: PCT/JP2010/065869
§ 371 (c)(1),
(2), (4) Date: Mar. 13, 2012

(87) PCT Pub. No.: WO2011/030908
PCT Pub. Date: Mar. 17, 2011

(65) Prior Publication Data
US 2012/0170535 A1    Jul. 5, 2012

(30) Foreign Application Priority Data
Sep. 14, 2009   (JP) .................................. 2009-211514

(51) Int. Cl.
*H04W 72/04*   (2009.01)
(52) U.S. Cl.
USPC ........................................................ 370/329
(58) Field of Classification Search
USPC ................................................ 370/329, 241
See application file for complete search history.

(56) References Cited

U.S. PATENT DOCUMENTS

| 8,165,085 B2* | 4/2012 | Nishio et al. .................. 370/329 |
| 8,411,635 B2* | 4/2013 | Nishio et al. .................. 370/329 |
| 8,526,376 B2* | 9/2013 | Nakao et al. .................. 370/329 |
| 2013/0044605 A1* | 2/2013 | Lee et al. ...................... 370/241 |

FOREIGN PATENT DOCUMENTS

| JP | 2009-188675 A | 8/2009 | |
| WO | WO 2009/057286 | * 5/2009 | ............. H04B 1/707 |

OTHER PUBLICATIONS

A. Kuramoto; Japanese Office Action JP2009-211514; Mar. 4, 2010.
3GPP TSG RAN WG1 #54; Samsung, Ericsson; 36.213 CRO43t2 (Rel-8, F) Clarification of tree structure of CCE aggregations; Jeju, Korea, Aug. 18-22, 2008.
3GPP TSG RAN WF1 Meeting #56; Research in Motion UK Limited; Blind Decoding for Carrier Aggregation; Shenzhen, China, Aug. 24-28m, 2009.

(Continued)

*Primary Examiner* — Albert T Chou
(74) *Attorney, Agent, or Firm* — Studebaker & Brackett PC

(57) ABSTRACT

When allocating CCEs as a radio resource to a new radio terminal within a predetermined sector, the disclosed radio base station (1) acquires the new AL corresponding to the new radio terminal, and identifies CCEs that cannot be allocated (non-allocatable CCEs) determined in response to an AL that is larger than said new AL. Furthermore, when a new search space wherein the CCE is completely unused exists among new search spaces corresponding to the new radio terminal, and when a non-allocatable CCE is contained in said new search space wherein the CCE is completely unused, the radio base station (1) allocates said non-allocatable CCE to the new radio terminal.

3 Claims, 5 Drawing Sheets

(56) References Cited

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release8); www.3gpp.org.

3GPP TS 36.213 V8.7.0 (May 2009); 3rd Generation Partnership Project; Technical Specification Group Radio Access Network; Evolved Universal Terrestrial Radio Access (E-UTRA); Physical layer procedures (Release 8); www.3gpp.org.

International Search Report; PCT/JP2010/065869; Dec. 28, 2010.

* cited by examiner

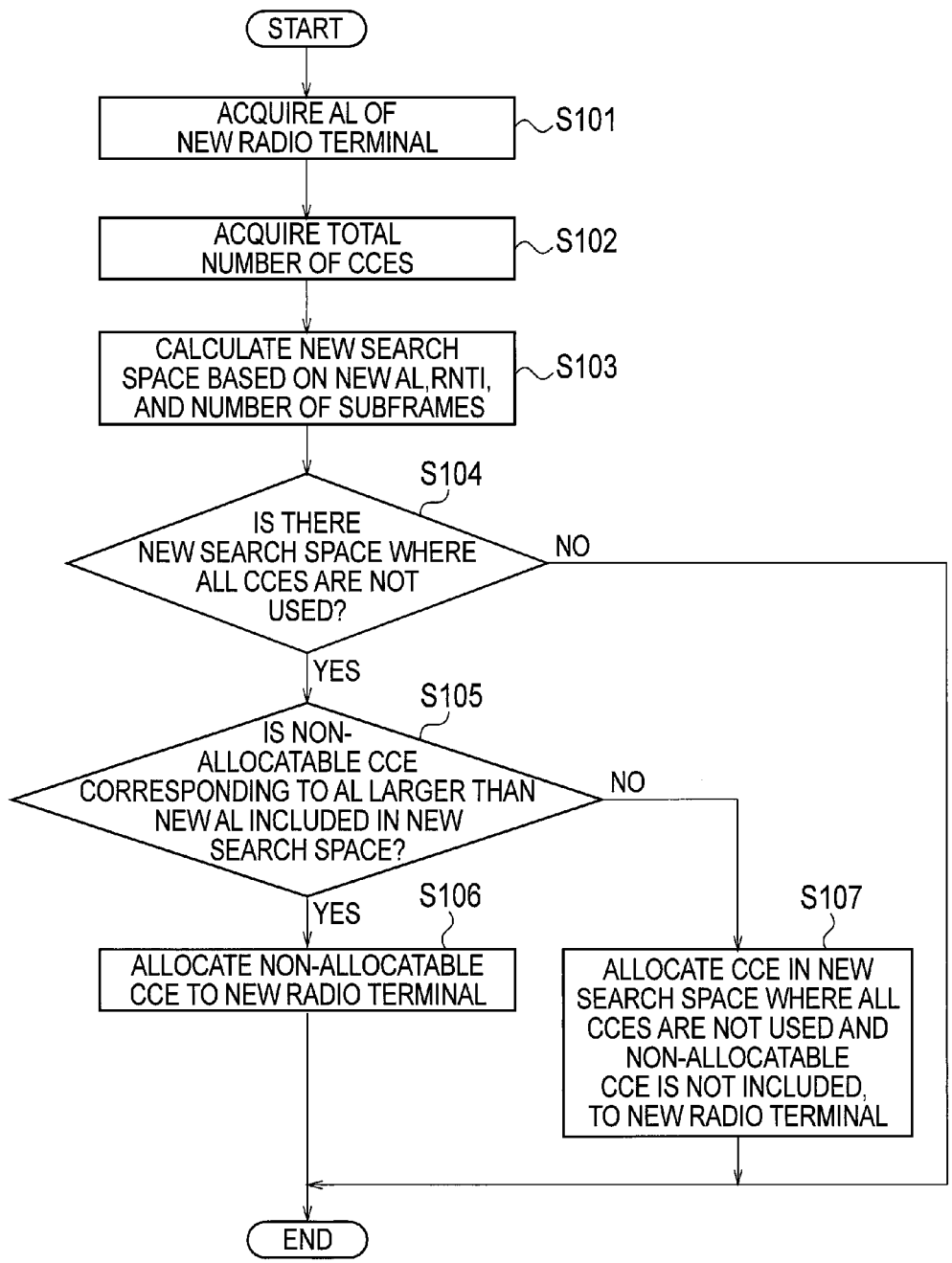

RADIO BASE STATION AND COMMUNICATION CONTROL METHOD

TECHNICAL FIELD

The present invention relates to a radio base station that forms a predetermined cell or sector and allocates a radio resource corresponding to the predetermined cell or sector to a radio terminal, and a communication control method in the radio base station.

BACKGROUND ART

In recent years, ongoing increase to capacity and speed is required in response to implementation of broadband to mobile communication services. In this regard, a 3rd-generation mobile communication system represented by W-CDMA (Wideband Code Division Multiple Access) or the next-generation mobile communication system, which is an alternative to a 3.5th-generation mobile communication system, has been commercialized all over the world. Also in Japan, frequency allocating for a 3.9th-generation mobile communication system, which is positioned as a mobile communication system leading to a 4th-generation mobile communication system, has begun. In the 3.9th-generation mobile communication system, LTE (Long Term Evolution) is the most powerful candidate for a standard led to the 4th-generation mobile communication system.

In the LTE, OFDMA (Orthogonal Frequency Division Multiplexing Access) is adopted for downlink communication toward a radio terminal from a radio base station, and SC-FDMA (Single Carrier Frequency Division Multiple Access) is adopted for uplink communication toward the radio base station from the radio terminal. In these multiplexing methods, user multiplexing is achieved by arranging a radio resource in the two-dimensions of frequency and time.

A frequency band, which is a downlink radio resource, is divided in units of a resource block (RB). The RB includes a control information channel (PDCCH: Physical Downlink Control CHannel), which is a time slot as a radio channel for downlink control information transmission, and a shared data channel (PDSCH: Physical Downlink Shared CHannel) which is a time slot as a radio channel for downlink user data transmission.

In the LTE, when a radio base station allocates CCE (Control Channel Element: a radio resource for a radio terminal) to each radio terminal, the radio base station sets an aggregation level (AL), which indicates the number of continuous CCEs to be ensured, with respect to the PDCCH for control information transmission. Thus, it is possible to perform allocating control corresponding to a radio state between the radio terminal and the radio base station.

In this case, in a CCE allocating position for transmitting control information toward the radio terminal, a certain level of allocating position is limited in advance as a search space for each radio terminal.

The search space is set to be different between radio terminals to the extent possible based on RNTI (Radio Network Temporary Id), which indicates unique information of a radio terminal, the number of subframes, and AL corresponding to the radio terminal (for example, see Non-Patent Documents 1 and 2).

PRIOR ART DOCUMENT

Non-Patent Document

Non-Patent Document 1: 3GPP TS 36.213 V8.7.0 "Technical Specification Group Radio Access Network; Evolved Universal Terrestrial Radio Access (E-UTRA); Physical layer procedures (Release 8)"

Non-Patent Document 2: 3GPP TS 36.211 V8.7.0 "Technical Specification Group Radio Access Network; Evolved Universal Terrestrial Radio Access (E-UTRA); Physical Channels and Modulation (Release 8)"

SUMMARY OF THE INVENTION

A radio base station allocates CCE to each radio terminal based on a predetermined reference, and notifies each radio terminal of a CCE allocating result through control information. At this time, when continuous CCEs in a search space determined by AL corresponding to a radio terminal have been already allocated to other radio terminals, the radio base station has to give up intended allocation, resulting in the reduction in the use efficiency of a radio resource.

Specifically, AL corresponding to a radio terminal with a bad radio condition with respect to a radio base station may be increased in many cases. However, it is difficult for such a radio terminal to ensure continuous CCEs corresponding to AL, so that a radio condition corresponding to the radio terminal may be further deteriorated.

Therefore, an object of the present invention is to provide a radio base station and a communication control method, capable of efficiently allocating a radio resource.

To solve the above problem, the present invention has following features. A first feature of the present invention is summarized as a radio base station (radio base station 1) that forms a predetermined cell or sector and allocates a radio resource corresponding to the predetermined cell or sector to a radio terminal (radio terminal 2A, 2B), the radio base station comprising: a continuous radio resource number acquisition unit (AL acquisition unit 160) configured to acquire a number of continuous radio resources determined by a radio state between the radio terminal and the radio base station; and an allocating unit (allocating unit 166) configured to allocate continuous non-allocatable radio resources to a predetermined radio terminal, the continuous non-allocatable radio resources having a number of continuous radio resources larger than a number of continuous radio resources corresponding to the predetermined radio terminal.

When such a radio base station allocates a radio resource to a predetermined radio terminal, the radio base station allocates continuous non-allocatable radio resources the number of which is larger than the number of continuous radio resources corresponding to the predetermined radio terminal.

It is more difficult to allocate radio resources to a radio terminal having a larger number of continuous radio resources. Thus, radio resources that cannot be allocated to the radio terminal with the large number of the continuous radio resources are allocated to a radio terminal with a small number of continuous radio resources, so that radio resources allocatable to the radio terminal with the large number of continuous radio resources can be ensured as many as possible, thereby preventing radio resources from being difficult to be endured and efficiently allocating radio resources.

A second feature of the present invention is summarized as that the allocating unit allocates the continuous non-allocatable radio resources to the predetermined radio terminal, the continuous non-allocatable radio resources having the number of continuous radio resources larger than the number of continuous radio resources corresponding to the predetermined radio terminal and included in a search region where all radio resources are not used, among search regions of radio resources determined for the predetermined radio terminal in advance non-allocatable.

A third feature of the present invention is summarized as that the radio resource is used to transmit control information.

A fourth feature of the present invention is summarized as a communication control method for a radio base station configured to form a predetermined cell or sector and allocate a radio resource corresponding to the predetermined cell or sector to a radio terminal, the communication control method comprising: a step in which the radio base station acquires a number of continuous radio resources determined by a radio state between the radio terminal and the radio base station; and a step in which the radio base station allocates continuous non-allocatable radio resources to a predetermined radio terminal, the continuous non-allocatable radio resources having a number of continuous radio resources larger than a number of continuous radio resources corresponding to the predetermined radio terminal.

According to the present invention, it is possible to efficiently allocate radio resources.

BRIEF DESCRIPTION OF THE DRAWINGS

FIG. 3 is a diagram illustrating an example of a non-allocatable CCE of each AL according to the embodiment of the present invention.

FIG. 4 is a diagram illustrating a CCE allocation example according to the embodiment of the present invention.

FIG. 5 is a flowchart illustrating a CCE allocation operation of the radio base station according to the embodiment of the present invention.

MODES FOR CARRYING OUT THE INVENTION

Figure 1:
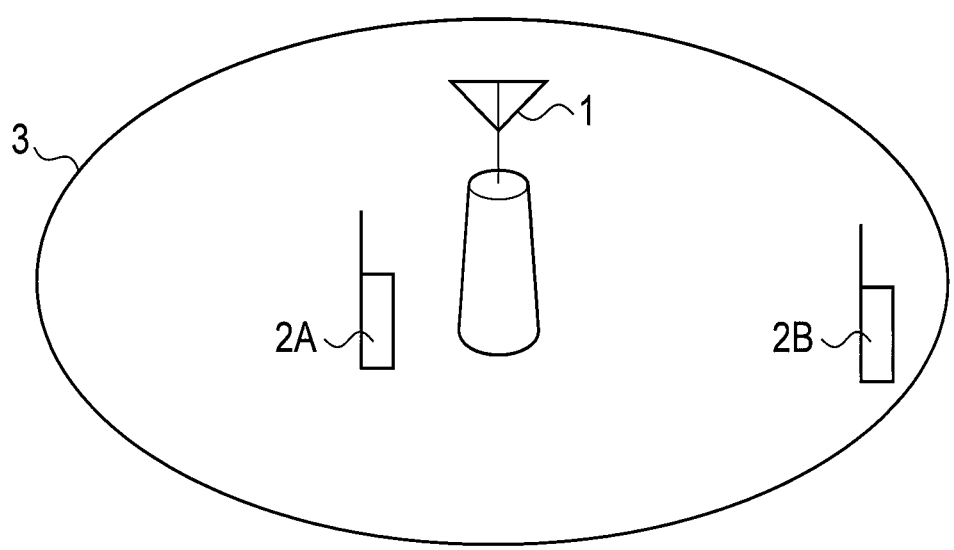
FIG. 1 is an entire schematic configuration diagram of a radio communication system according to an embodiment of the present invention.

Next, an embodiment of the present invention will be described with reference to the drawings. Specifically, (1) Configuration of Radio Communication System, (2) Operation of Radio Base Station, (3) Operation and Effect, and (4) Other Embodiments will be described. It is to be noted that the same or similar reference numerals are applied to the same or similar parts through the drawings in the following embodiments.

(1) Configuration of Radio Communication System (1.1) Entire Schematic Configuration of Radio Communication System FIG. 1 is a diagram showing the entire schematic configuration of a radio communication system 10 according to an embodiment of the present invention.

The radio communication system 10 illustrated in FIG. 1 has a configuration based on LTE (Long Term Evolution) which is a standard designed in a 3GPP. The radio communication system 10 includes a radio base station 1 and radio terminals 2A and 2B.

In FIG. 1, a cell 3 is divided into a plurality of sectors (not illustrated). In FIG. 1, the radio terminals 2A and 2B exist in one sector (a predetermined sector). The radio base station 1 performs communication between the radio terminals 2A and 2B existing in the cell 3.

(1.2) Configuration of Radio Base Station

Figure 2:
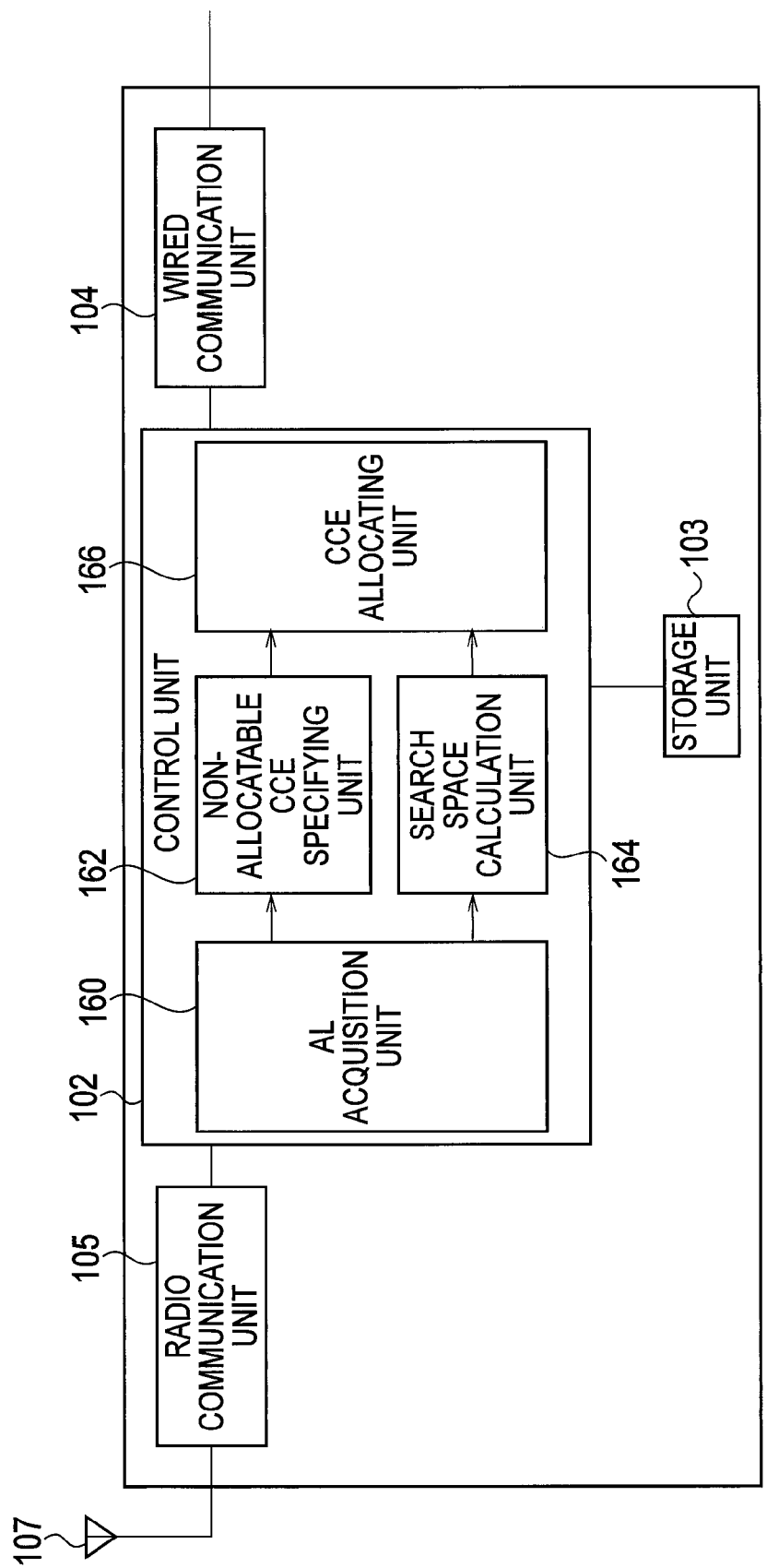
FIG. 2 is a diagram illustrating the configuration of a radio base station according to the embodiment of the present invention.

FIG. 2 is a diagram illustrating the configuration of the radio base station 1. The radio base station 1 illustrated in FIG. 2 includes a control unit 102, a storage unit 103, a wired communication unit 104, a radio communication unit 105, and an antenna 107.

The control unit 102, for example, includes a CPU and controls various functions of the radio base station 1. The storage unit 103, for example, includes a memory and stores various types of information used for control and the like of the radio base station 1. The wired communication unit 104 is connected to a backbone network (not illustrated) through a router and the like (not illustrated). The radio communication unit 105 receives a radio signal from the radio terminals 2A and 2B, and transmits a radio signal to the radio terminals 2A and 2B through the antenna 107.

Next, detailed control of the control unit 102 will be described. The control unit 102 allocates CCE (Control Channel Element), which constitutes a resource block (RB) being a downlink radio resource, to the radio terminals 2A and 2B, which are radio terminals in one sector constituting the cell 3 formed by the radio base station 1, according to channel quality required by the radio terminals 2A and 2B.

The RB includes two types of radio channels, specifically, a control information channel (PDCCH) and a shared data channel (PDSCH). A region of the PDCCH reaches from the head of the RB to three OFDM symbols at maximum, and includes a plurality of CCEs. A region of the PDSCH is OFDM symbols following the PDCCH.

Channel quality required by radio terminals in a predetermined sector is various. The control unit 102 sets the number of CCEs to be allocated to radio terminals and allocates the resultant CCEs according to the channel quality required by the radio terminals.

Furthermore, the control unit 102 sets a modulation method, a coding rate, the number of retransmissions, and a communication scheme such as MIMO (Multiple-Input Multiple-Output) according to the channel quality required by the radio terminals in the predetermined sector.

The PDCCH includes various types of information required for receiving user data included in the PDSCH. Accordingly, when it is not possible to receive the information included in the PDCCH, it is not possible for a radio terminal to receive the user data included in the PDSCH. In this regard, the PDCCH is a very important radio channel.

In the allocating of CCE in the PDCCH, the number of continuous CCEs to be ensured is called an aggregation level (AL).

The control unit 102 determines the AL such that the quality of the PDCCH satisfies SINR (Signal to Interference and Noise Ratio) corresponding to the AL for each radio terminal in the predetermined sector, so that a coding rate can be adjusted through repetition and characteristic improvement can be achieved.

As illustrated in FIG. 2, the control unit 102 includes an AL acquisition unit 160, a non-allocatable CCE specifying unit 162, a search space calculation unit 164, and a CCE allocating unit 166.

Whenever an arbitrary radio terminal (a new radio terminal) is selected from radio terminals with not allocated CCEs in a predetermined sector, the AL acquisition unit 160 estimates the quality (SINR) of the PDCCH corresponding to the radio terminal.

For example, the new radio terminal in the predetermined sector measures W-CQI corresponding to the average quality of the PDSCH included in a predetermined downlink radio resource. Furthermore, the new radio terminal in the predetermined sector transmits the measured W-CQI toward the radio base station 1. The AL acquisition unit 160 in the control unit 102 of the radio base station 1 receives the W-CQI from the new radio terminal through the antennal 107 and the radio communication unit 105. Next, the AL acquisition unit 160 converts the W-CQI, which is received from the new radio terminal, to SINR, and uses the SINR as SINR of the PDCCH corresponding to the new radio terminal. In addition, the AL acquisition unit 160 may also estimate the SINR of the PDCCH corresponding to the new radio terminal by using other techniques.

In this way, after estimating the SINR of the PDCCH corresponding to the new radio terminal in the predetermined sector, the AL acquisition unit 160 determines AL corresponding to the new radio terminal in the predetermined sector such that the AL becomes lower as the SINR of the PDCCH is higher.

The non-allocatable CCE specifying unit 162 specifies a non-allocatable CCE, which is determined corresponding to ALs, for each AL.

Specifically, the non-allocatable CCE specifying unit 162 acquires the total number of CCEs. The total number of CCEs is the number of all CCEs included in the PDCCH, and for example, is stored in the storage unit 103 in advance.

Next, the non-allocatable CCE specifying unit 162 acquires the remainder, which is obtained by dividing the total number of CCEs by the AL, for each AL, and specifies rear CCEs of all the CCEs, which correspond to the number of the remainder, as non-allocatable CCEs corresponding to the AL.

FIG. 3 is a diagram illustrating an example of non-allocatable CCEs of each AL. In FIG. 3, CCEs from CCE 0 to CCE 38 exist and the total number of CCEs is 39.

In FIG. 3, in the case of AL1, since the remainder obtained by dividing the total number 39 of CCEs by the AL1 is 0, a non-allocatable CCE corresponding to the AL1 does not exist. In the case of AL2, since the remainder obtained by dividing the total number 39 of CCEs by the AL2 is 1, a non-allocatable CCE corresponding to the AL2 is the last CCE 38. In the case of AL4, since the remainder obtained by dividing the total number 39 of CCEs by the AL4 is 3, non-allocatable CCEs corresponding to the AL4 are the rear CCE 36 to CCE 38. In the case of AL 8, since the remainder obtained by dividing the total number 39 of CCEs by the AL8 is 7, non-allocatable CCEs corresponding to the AL8 are the rear CCE 32 to CCE 38.

The search space calculation unit 164 calculates a search space with respect to the new radio terminal in the predetermined sector.

Specifically, the search space calculation unit 164 acquires the RNTI of the new radio terminal in the predetermined sector, the number of subframes, and the total number of CCEs. The RNTI of the new radio terminal is included in a radio signal from the new radio terminal. Furthermore, the number of subframes and the total number of CCEs, for example, are stored in the storage unit 103 in advance.

Next, the search space calculation unit 164 calculates a search space corresponding to a pseudo random sequence generated using the RNTI of the new radio terminal in the predetermined sector, the number of subframes, and the total number of CCEs.

For example, when the AL corresponding to the new radio terminal is 8 and the total number of CCEs is 39, search spaces are CCE 0 to CCE 7, CCE 8 to CCE 15, CCE 16 to CCE 23, and CCE 24 to CCE 31.

The CCE allocating unit 166 allocates CCE to the new radio terminal in the predetermined sector.

Specifically, the CCE allocating unit 166 determines the presence or absence of a new search space, where all the CCEs are not used, among search spaces (new search spaces) corresponding to the new radio terminal in the predetermined sector. For example, the storage unit 103 stores information which indicates whether each CCE is not used or has already been allocated.

When there exists the new search space where all the CCEs are not used, the CCE allocating unit 166 determines whether non-allocatable CCEs corresponding to AL higher than AL corresponding to the new radio terminal are included in the new search space where all the CCEs are not used. For example, when the AL corresponding to the new radio terminal is 2, the CCE allocating unit 166 determines whether non-allocatable CCEs corresponding to the AL 4 higher than the AL 2 are included in the new search space where all the CCEs are not used. When the non-allocatable CCEs are included in the new search space where all the CCEs are not used, the CCE allocating unit 166 allocates CCEs, among the non-allocatable CCEs, of an AL number, which corresponds to the new radio terminal, to the new radio terminal. Meanwhile, when the non-allocatable CCEs are not included in the new search space where all the CCEs are not used, the CCE allocating unit 166 allocates CCEs of a new search space, where all the CCEs are not used and the non-allocatable CCEs are not included, to the new radio terminal.

FIG. 4 is a diagram illustrating a CCE allocating example. In FIG. 4, it is assumed that a radio terminal corresponding to the AL 1 is a new radio terminal and AL higher than the AL1 is the AL8.

In the example of FIG. 4, non-allocatable CCEs corresponding to the AL8 are CCE 32 to CCE 38. Meanwhile, a new search space corresponding to the new radio terminal is all CCEs except for an already used CCE 3. Accordingly, the CCE allocating unit 166 allocates the AL number corresponding to the new radio terminal, that is, one CCE among the CCE 32 to CCE 38, to the new radio terminal, wherein the CCE 32 to CCE 38 are included in a new search space where all CCEs are not used, and are non-allocatable CCEs.

Then, the control unit 102 transmits information on the CCE allocated by the CCE allocating unit 166, for example, information capable of uniquely specifying CCE, to the new radio terminal in the predetermined sector through the radio communication unit 105 and the antenna 107.

Thereafter, the control unit 102 transmits allocating information of PDSCH, allocating information of an uplink shared data channel (PUSCH: Physical Uplink Shared CHannel), and control information including a transmission power control command to the new radio terminal through the radio communication unit 105 and the antenna 107 by using the CCEs allocated to the new radio terminal.

When the control information transmitted using the PDCCH is normally received, the new radio terminal performs various types of control based on the control information. Specifically, the new radio terminal receives the user data transmitted using the allocated PDSCH, and transmits the user data using the allocated PUSCH. Furthermore, the new radio terminal controls transmission power according to the transmission power control command. Then, if the user data transmitted by using the PDSCH is received, the new radio terminal transmits ACK or NACK to the radio base station 1 as a response by using the PUSCH.

(2) Operation of Radio Base Station

FIG. 5 is a flowchart illustrating CCE allocating operation of the radio base station 1.

In step S101, the control unit 102 acquires AL of a new radio terminal in a predetermined sector.

In step S102, the control unit 102 acquires the total number of CCEs.

In step S103, the control unit 102 calculates search spaces (new search spaces) corresponding to the new radio terminal based on AL (a new AL) corresponding to the new radio terminal, RNTI of the new radio terminal, and the number of subframes.

In step S104, the control unit 102 determines whether a new search space, where all CCEs are not used, exists in the calculated new search spaces. When there exists no new search space where all the CCEs are not used, a series of operations are ended.

Meanwhile, when the new search space, where all the CCEs are not used, exists in the calculated new search spaces, the control unit 102 determines whether non-allocatable CCEs determined corresponding to AL higher than the AL corresponding to the new radio terminal are included in the new search space where all the CCEs are not used, in step S105.

When the non-allocatable CCEs are included in the new search space where all the CCEs are not used, the control unit 102 allocates CCEs of a number, which corresponds to the new AL among the non-allocatable CCEs, to the new radio terminal, in step S106.

Meanwhile, when the non-allocatable CCEs are not included in the new search space where all the CCEs are not used, the control unit 102 allocates CCEs in the new search space, where all the CCEs are not used and no non-allocatable CCEs are included, to own radio terminal, in step S107.

(3) Operation and Effect

In the present embodiment, when allocating CCE to a new radio terminal in a predetermined sector as a radio resource, the radio base station 1 acquires a new AL corresponding to the new radio terminal and specifies a non-allocatable CCE determined corresponding to AL higher than the new AL. In addition, when a new search space where all the CCEs are not used exists in new search spaces corresponding to the new radio terminal, and the non-allocatable CCE is included in the new search space where all the CCEs are not used, the radio base station 1 allocates the non-allocatable CCE to the new radio terminal.

As a radio terminal has higher AL, in other words, as the number of continuous unused CCEs to be ensured is larger, it is difficult to allocate CCE to the radio terminal. Consequently, CCE that cannot be allocated to the radio terminal with the high AL is allocated to a radio terminal with a low AL, so that it is possible to ensure CCEs that can be allocated to the radio terminal with the high AL as many as possible. As a consequence, it is possible to prevent CCEs from being difficult to be ensured and efficiently allocate CCEs.

(4) Other Embodiments

While the present invention has been described by way of the foregoing embodiments, it should not be understood that those descriptions and drawings constituting a part of the present disclosure limit the present invention. Further, various substitutions, examples or operational techniques shall be apparent to a person skilled in the art based on this disclosure.

In the above-mentioned embodiment, the search space is set. However, even when the search space is not set, the present invention can be applied in the same manner. In this case, when allocating CCE to a radio terminal, it is sufficient if the CCE allocating unit 166 of the control unit 102 of the radio base station 1 allocates non-allocatable CCE corresponding to AL higher than AL corresponding to the radio terminal.

Furthermore, in the above-mentioned embodiment, CCE is allocated to the new radio terminal in the predetermined sector. However, in the case in which a cell has not been divided into sectors, even when allocating CCE to a radio terminal newly entering the cell, the present invention can be applied in the same manner.

Thus, it must be understood that the present invention includes various embodiments that are not described herein. Therefore, the present invention is limited only by the specific features of the invention in the scope of the claims reasonably evident from the disclosure above.

The entire contents of Japanese Patent Application No. 2009-211514 (filed on Sep. 14, 2009) are incorporated in the present specification by reference.

INDUSTRIAL APPLICABILITY

The radio base station and the communication control method of the present invention can efficiently allocate a radio resource, and are available as a radio base station and a communication control method.

The invention claimed is:

1. A radio base station that forms a predetermined cell or sector and allocates a radio resource corresponding to the predetermined cell or sector to a radio terminal, the radio base station comprising:

continuous radio resource number acquisition unit acquires a number of continuous radio resources determined by a radio state between the radio terminal and the radio base station, the acquired number selected from a predetermined set of numbers;

a non-allocatable radio resources specifying unit configured to acquire a total number of radio resources and determine, for each number in the predetermined set of numbers, a remainder value by dividing the acquired total number of radio resources by that respective number of the predetermined set, each said remainder value corresponding to a number of non-allocatable radio resources for the respective number of the predetermined set;

a search space calculation unit configured to determine search regions for a predetermined radio terminal based on the acquired number of continuous radio resources for the predetermined radio; and an allocating unit configured to allocate continuous non-allocatable radio resources of the specified radio resources to the predetermined radio terminal, the continuous non-allocatable radio resources included in one of the determined search regions where all radio resources are not used and having a number of continuous radio resources larger than a number of continuous radio resources corresponding to the predetermined radio terminal.

2. The radio base station according to claim 1, wherein the radio resource is used to transmit control information.

3. A communication control method for a radio base station configured to form a predetermined cell or sector and allocate a radio resource corresponding to the predetermined cell or sector to a radio terminal, the communication control method comprising:

a step in which the radio base station acquires a number of continuous radio resources determined by a radio state between the radio terminal and the radio base station the acquired number selected from a predetermined set of numbers;

a step of acquiring a total number of radio resources and determining, for each number in the predetermined set of numbers, a remainder value by dividing the acquired total number of radio resources by that respective number of the predetermined set, each said remainder value corresponding to a number of non-allocatable radio resources for the respective number of the predetermined set;

a step of determining search regions for a predetermined radio terminal based on the acquired number of continuous radio resources for the predetermined radio; and a step in which the radio base station allocates continuous non-allocatable radio resources of the specified radio resources to the predetermined radio terminal, the continuous non-allocatable radio resources included in one of the determined search regions where all radio resources are not used and having a number of continuous radio resources larger than a number of continuous radio resources corresponding to the predetermined radio terminal.

* * * * *